United States Patent [19]

Ueda et al.

[11] Patent Number: 5,557,325

[45] Date of Patent: Sep. 17, 1996

[54] VIDEO CAMERA AND ITS CONTROL METHOD

[75] Inventors: Osamu Ueda, Kawasaki; Hirofumi Suda, Yokohama, both of Japan

[73] Assignee: Canon Kabushiki Kaisha, Tokyo, Japan

[21] Appl. No.: 489,255

[22] Filed: Jun. 14, 1995

Related U.S. Application Data

[63] Continuation of Ser. No. 72,915, Jun. 7, 1993, abandoned.

[30] Foreign Application Priority Data

Jun. 8, 1992 [JP] Japan ..................... 4-147722

[51] Int. Cl.$^6$ ..................... H04N 9/73
[52] U.S. Cl. ..................... 348/223; 348/229
[58] Field of Search ..................... 348/208, 154, 348/155, 362, 363, 364, 365, 306, 222, 229, 230, 234, 207, 253, 254, 225, 229, 312, 223; H04N 9/04, 9/07

[56] References Cited

U.S. PATENT DOCUMENTS

| | | | |
|---|---|---|---|
| 4,719,511 | 1/1988 | Hirobe et al. | 348/364 |
| 5,093,716 | 3/1992 | Kondo et al. | 348/364 |
| 5,128,769 | 7/1992 | Arai et al. | 348/363 |
| 5,184,172 | 2/1993 | Miyazaki | 348/365 |
| 5,363,137 | 11/1994 | Suga et al. | 348/302 |
| 5,489,939 | 2/1996 | Haruki et al. | 348/223 |

OTHER PUBLICATIONS

Encyclopedia of Computer Science & Engineering, 2nd ed., Ralston and Reilly, Jr., editors, 1983 Hellerman, Herbert, *Interrupt*, pp. 801–804.

*Primary Examiner*—Wendy R. Garber
*Assistant Examiner*—Tuan V. Ho
*Attorney, Agent, or Firm*—Morgan & Finnegan LLP

[57] ABSTRACT

A video camera comprises an image pickup device, an extracting circuit to extract a partial image signal corresponding to a picture plane range of a predetermined portion from a whole image signal which is generated from the image pickup device, and a microcomputer to determine a correction value of the whole image signal on the basis of an output signal of the extracting circuit. The extracting circuit has a function to generate an interruption signal to the microcomputer at a time point when the extracting operation of the partial image signal by the extracting circuit ends. The video camera further has a correcting circuit to correct the whole image signal on the basis of the correction value decided by the microcomputer.

13 Claims, 5 Drawing Sheets

VIDEO CAMERA AND ITS CONTROL METHOD

This is a continuation of application Ser. No. 08/072,915, filed on Jun. 7, 1993, now abandoned.

BACKGROUND OF THE INVENTION

1. Field of the Invention

The present invention relates to a video camera having therein a microcomputer and its control method.

2. Related Background Art

In a video camera, in order to perform an adjustment of the white balance, a correction of the exposure, and the like, there is used a method whereby a position of a predetermined portion in a picture plane and image signal data in a predetermined range are extracted and the white balance and exposure are corrected to proper states on the basis of those information. To control such a correction and to control the whole photographing operation, hitherto, a microcomputer is built in the video camera.

As a method of extracting the position of a predetermined portion in the picture plane and the image signal data in a predetermined range as mentioned above, there has been known a method whereby a microcomputer calculates the position of a predetermined pixel of an image pickup device by a clock signal and a sync signal from the video camera or by a clock signal of the microcomputer itself or the like, thereby extracting a video signal in a predetermined range of the image pickup device.

As another method, there has been known a method whereby a microcomputer generates data indicative of a predetermined position and a predetermined range of a picture plane to an external circuit and the external circuit automatically calculates the pixel position of an image pickup device on the basis of a clock signal and a sync signal of a video camera, thereby extracting image data.

In the former method in the above conventional methods, however, there is a problem such that since the microcomputer extracts image information at a predetermined position in the picture plane, most of the ability of the microcomputer is expended and the ability to control the other portions in the video camera deteriorates. Even in the case where a circuit is provided in the outside as in the latter method, there is a problem such that in order to monitor the end of extraction of the image information at a predetermined position, the microcomputer needs to monitor the external circuit at a predetermined interval, so that its processing ability similarly deteriorates. Therefore, in case of controlling the operation of the video camera by one microcomputer, there is a problem such that the operation cannot be controlled at a high speed and the operation of each section of the video camera is slow.

SUMMARY OF THE INVENTION

The present invention is, therefore, made in consideration of the above problems and it is an object of the invention to provide a video camera which can execute the operation at a high speed without deteriorating a processing ability of a microcomputer and also to provide a control method of such a video camera.

To solve the above problems and to accomplish the above object, according to an embodiment of the present invention, there is provided a video camera comprising: an image pickup device; an extracting circuit to extract a partial image signal corresponding to a predetermined picture plane range from a whole image signal that is generated from the image pickup device; and a microcomputer to decide a correction value of the whole image signal on the basis of an output signal of the extracting circuit, wherein the extracting circuit has a function to generate an interruption signal to the microcomputer at a time point when the extracting operation of the partial image signal by the extracting circuit ends.

According to another embodiment of the invention, the above video camera further has a correcting circuit to correct the whole image signal on the basis of the correction value determined by the microcomputer.

According to an embodiment of the invention, there is also provided a control method of a video camera whereby a partial image signal corresponding to a predetermined picture plane range is extracted by an extracting circuit from a whole image signal that is generated from an image pickup device and a correction value of the whole image signal is determined by a microcomputer on the basis of the information of the partial image signal extracted, wherein the extracting circuit generates an interruption signal to the microcomputer at a time point when the extracting operation of the partial image signal by the extracting circuit ends.

Since the video camera and its control method according to the embodiments of the invention have been constructed as mentioned above, the extracting circuit generates the interruption signal to the microcomputer when the extracting operation of the partial image signal is finished, so that the microcomputer doesn't need to always monitor an end timing of the operation of the extracting circuit. After the interruption signal was generated, the microcomputer can concentratedly execute another control operation for a period of time until the next interruption signal is generated. Consequently, the processing ability of the microcomputer is improved and the operation of each section in the video camera can be executed at a high speed.

The above and other objects and features of the present invention will become apparent from the following detailed description and the appended claims with reference to the accompanying drawings.

DETAILED DESCRIPTION OF THE PREFERRED EMBODIMENTS

A preferred embodiment of the present invention will be described in detail hereinbelow with reference to the drawings.

Figure 1:
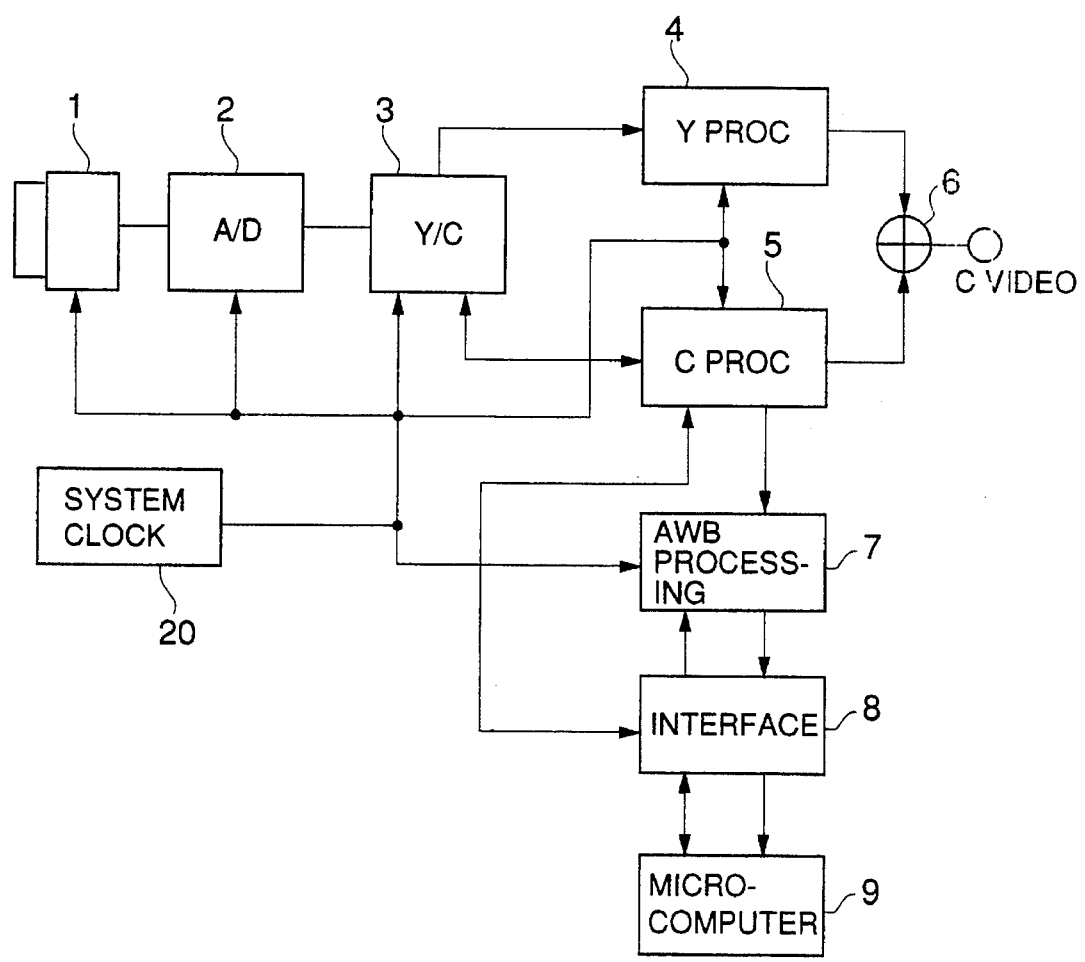
FIG. 1 is a block diagram showing a construction of an embodiment of a video camera according to the present invention.

FIG. 1 is a block diagram showing a construction of an embodiment of a video camera according to the invention. In FIG. 1, reference numeral 1 denotes an image pickup device; 2 an A/D converter to convert an analog signal which is generated from the image pickup device 1 into a digital signal; 3 a Y/C separating circuit to respectively separate the digital signal supplied from the A/D converter into a luminance component and a color component; 4 a luminance signal processing circuit to process the luminance component supplied from the Y/C separating circuit 3 as a luminance signal; 5 a chrominance signal processing circuit to process the color component supplied from the Y/C separating circuit 3 as a chrominance signal; and 6 a synthesizing circuit for synthesizing the luminance signal supplied from the luminance signal processing circuit 4 and the chrominance signal supplied from the chrominance signal processing circuit 5, thereby forming a color video signal.

Reference numeral 7 denotes an AWB processing circuit for receiving and processing color difference signals in the chrominance signal that is supplied from the chrominance signal processing circuit 5; 8 an interface circuit for transmitting and receiving data between a microcomputer 9 and the AWB processing circuit 7 and for transmitting and receiving data between the microcomputer 9 and the chrominance signal processing circuit 5; 9 the microcomputer to control the operation of each section in the video camera such as extracting operation of special data from image information, signal processing operation of each section, and the like; and 20 a system clock generating circuit to supply a timing clock to control the timing for each operation to each section in the video camera.

Figure 2:
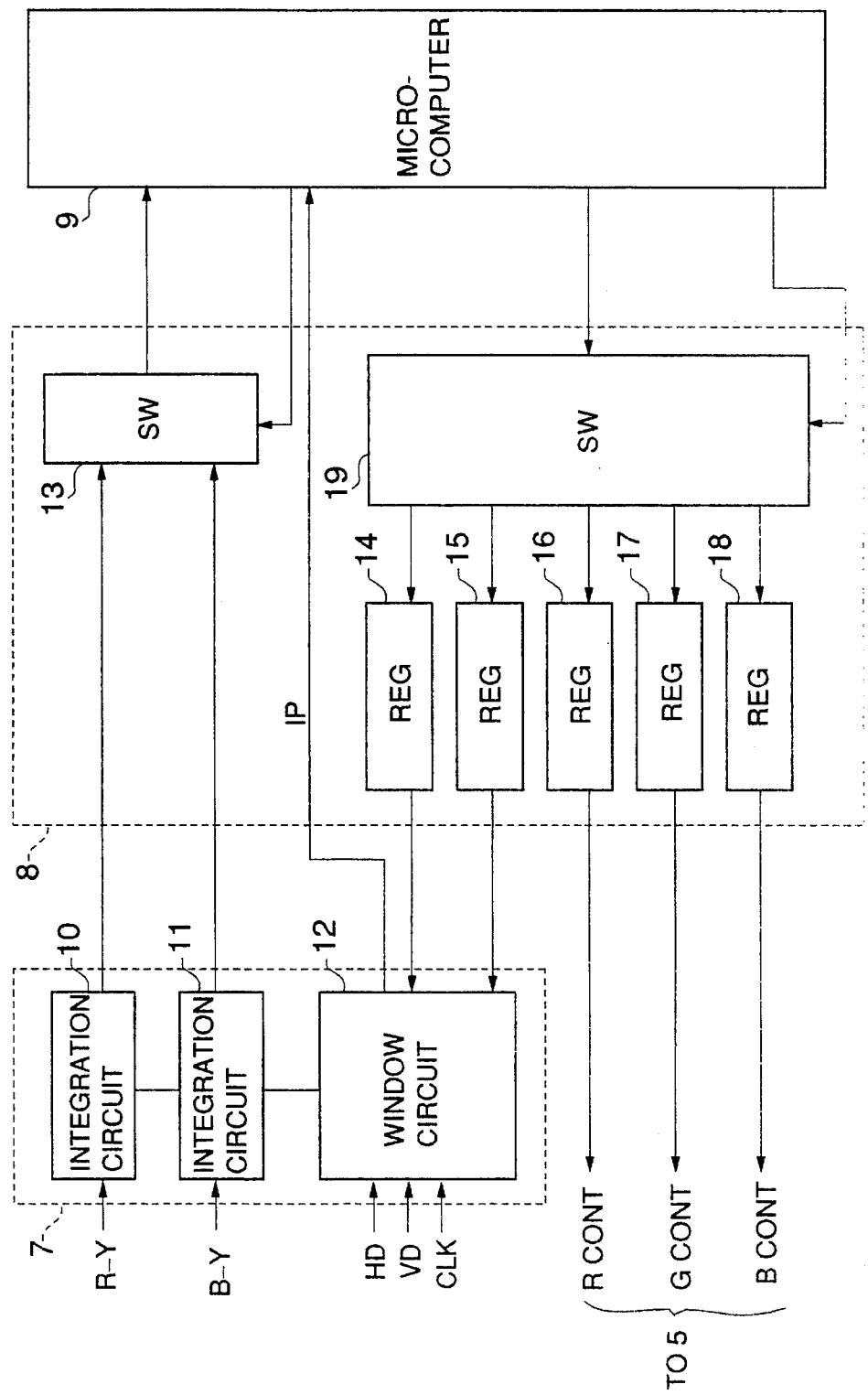
FIG. 2 is a block diagram showing further in detail a construction of an AWB processing circuit, an interface circuit, and a microcomputer.

FIG. 2 is a block diagram showing further in detail a construction of the AWB processing circuit 7, interface circuit 8, and microcomputer 9 shown in FIG. 1.

In the diagram, reference numeral 10 denotes an integration circuit to integrate a color difference signal (R-Y); 11 an integration circuit to integrate a color difference signal (B-Y); and 12 a window circuit to instruct the fetching or omitting of special data to the integration circuits 10 and 11 on the basis of a clock signal and a sync signal which are generated from the system clock generating circuit 20 and position information and range information indicated from the microcomputer 9.

Reference numeral 13 denotes a switch to switch from which one of the integration circuits 10 and 11 the data is supplied to the microcomputer 9; 14 a position register to preserve the position information sent from the microcomputer 9; 15 a range register to preserve the range information sent from the microcomputer 9; 16, 17, and 18 control signal registers to adjust the white balance by the chrominance signal processing circuit 5; and 19 a switch to switch into which one of the position register 14, range register 15, and control signal registers 16 to 18 the data is written.

The operation of the video camera constructed as mentioned above will now be described.

The video signal which had been photoelectrically converted by the image pickup device 1 and was generated from the image pickup device 1 is converted into the digital signal by the A/D converter 2. The digital signal supplied from the A/D converter 2 is sent to the Y/C separating circuit 3 and is separated into the luminance component and the color component. In the luminance component and color component separated by the Y/C separating circuit, the luminance component is converted into the luminance signal by the luminance signal processing circuit 4 and the color component is converted into the chrominance signal by the chrominance signal processing circuit 5. The luminance signal and chrominance signal are synthesized by the synthesizing circuit 6 and are generated as a compound color video signal.

On the other hand, the color difference signals (R-Y) and (B-Y) are supplied from the chrominance signal processing circuit 5 to the AWB processing circuit 7. In the AWB processing circuit 7, those color difference signals are integrated by the integration circuits 10 and 11, respectively. In the AWB processing circuit 7, the window circuit 12 sets the integration circuits 10 and 11 into the "operative" state within a range of the window (range on a picture plane designated by the range information) and sets the integration circuits 10 and 11 into the "stop" state out of the window range on the basis of the clock signal and sync signal which are generated from the system clock generating circuit 20 and the position information and range information which are supplied from the interface circuit 8.

Figure 3:
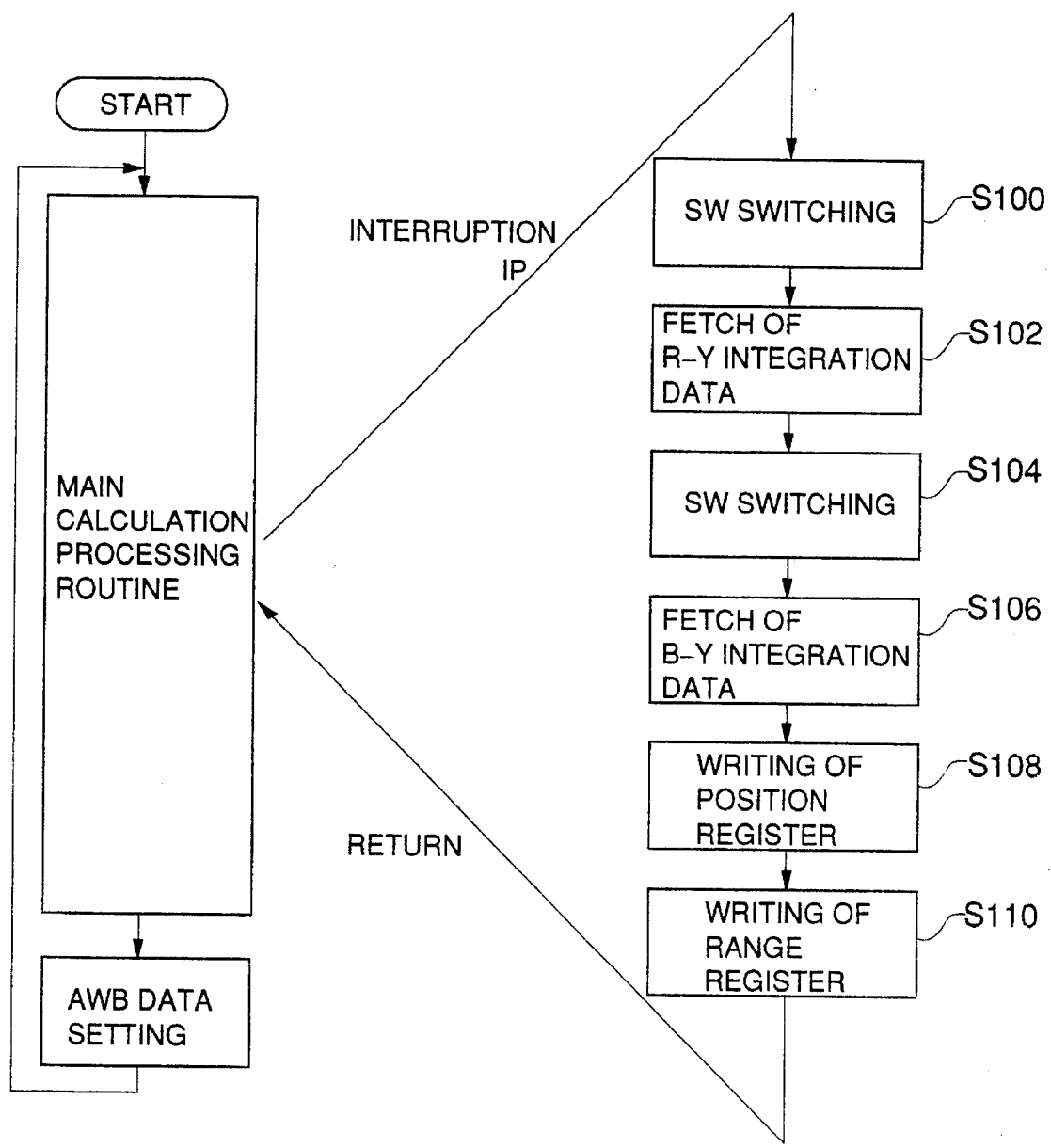
FIG. 3 is a diagram showing the operations which are executed for a period of time after a window circuit generated an interruption signal until the next interruption signal is generated.

After completion of the integrating operation of the signal of the last pixel in the window, as shown in FIG. 3, the window circuit 12 supplies an interruption signal IP to the microcomputer 9. When the interruption signal is received, the microcomputer 9 switches the switch 13 in the interface circuit 8 in steps S100 and S104. The data of the color difference signals (R-Y) and (B-Y) of the integration circuits 10 and 11 are read out, respectively (steps S102 and S106). After that, in steps S108 and S110, the microcomputer 9 writes new data into the position register 14 and range register 15 in order to set the next integration window. The apparatus waits until the integrating operations of the signals in the window based on the new data are finished in the integration circuits 10 and 11 and the interruption signal is again generated from the window circuit 12.

FIG. 3 shows the above series of operations after the window circuit 12 generated the interruption signal.

When the data is read out from the integration circuits 10 and 11, the microcomputer 9 calculates the balance of each color component on the basis of those read-out data and so as to set the white balance into a proper state and writes data to adjust each signal gain of RGB in the chrominance signal processing circuit 5 into the control signal registers 16, 17 and 18.

The image information at a predetermined position and in a predetermined range on the picture plane is extracted as mentioned above. The white balance is adjusted on the basis of the extracted image information. In the embodiment, after completion of the integration of the extracted image information signal, the window circuit 12 generates the interruption signal to the microcomputer 9. Therefore, the microcomputer 9 doesn't need to always monitor the end timing of the operation of each integration circuit. The microcomputer 9 can concentratedly execute another control operation for a period of time after the interruption signal was generated until the next interruption signal is generated. Consequently, a processing ability of the microcomputer 9 is improved.

(Another embodiment)

Another embodiment of a video camera according to the invention will now be described. Since a construction of another embodiment includes the same portions as those in the first embodiment, the same portions as those shown in the first embodiment are designated by the same reference numerals and their descriptions are omitted.

Figure 4:
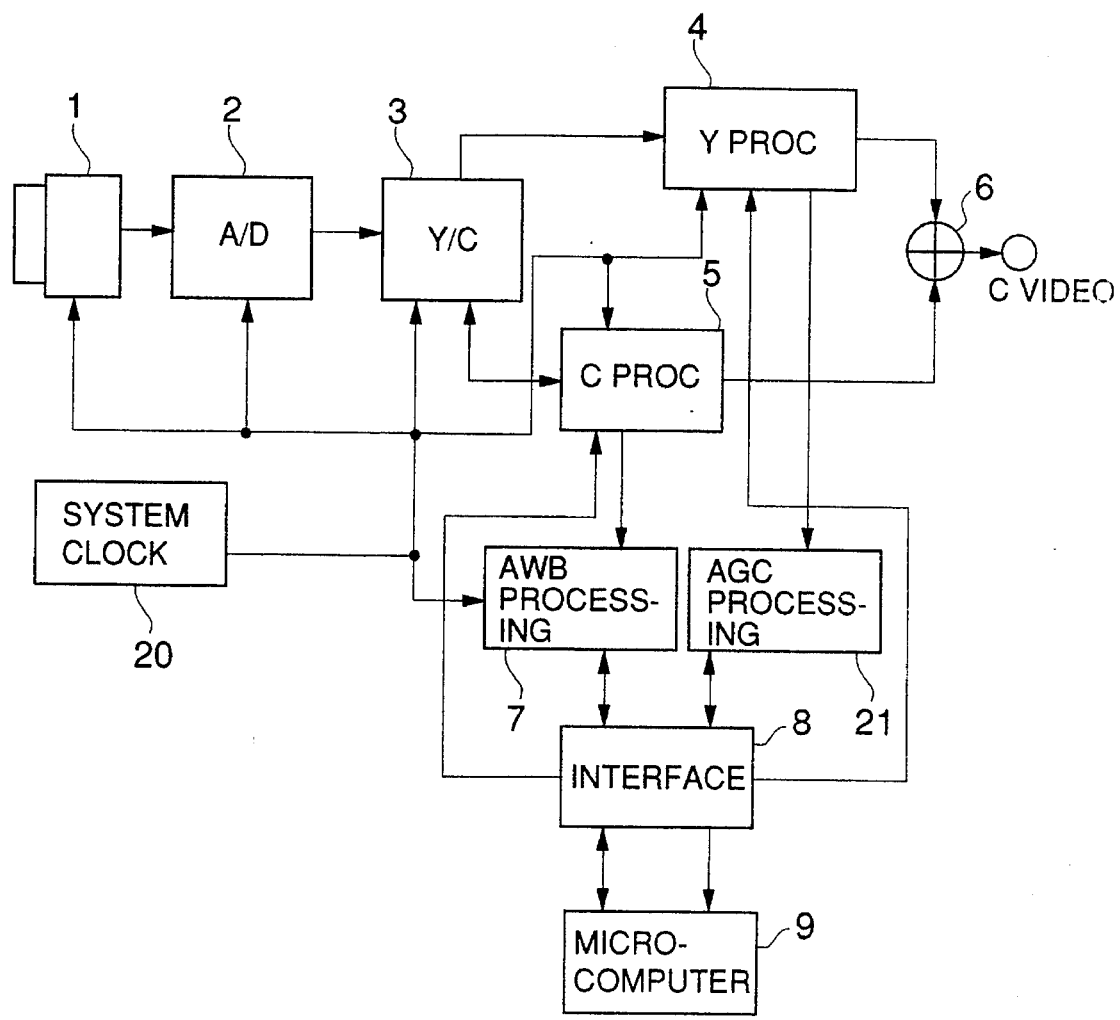
FIG. 4 is a block diagram showing a construction of another embodiment of a video camera according to the invention.

FIG. 4 is a block diagram showing the construction of another embodiment of a video camera according to the invention.

In FIG. 4, reference numeral 21 denotes an AGC processing circuit to receive the luminance signal from the luminance signal processing circuit 4 and to process the signal.

Figure 5:
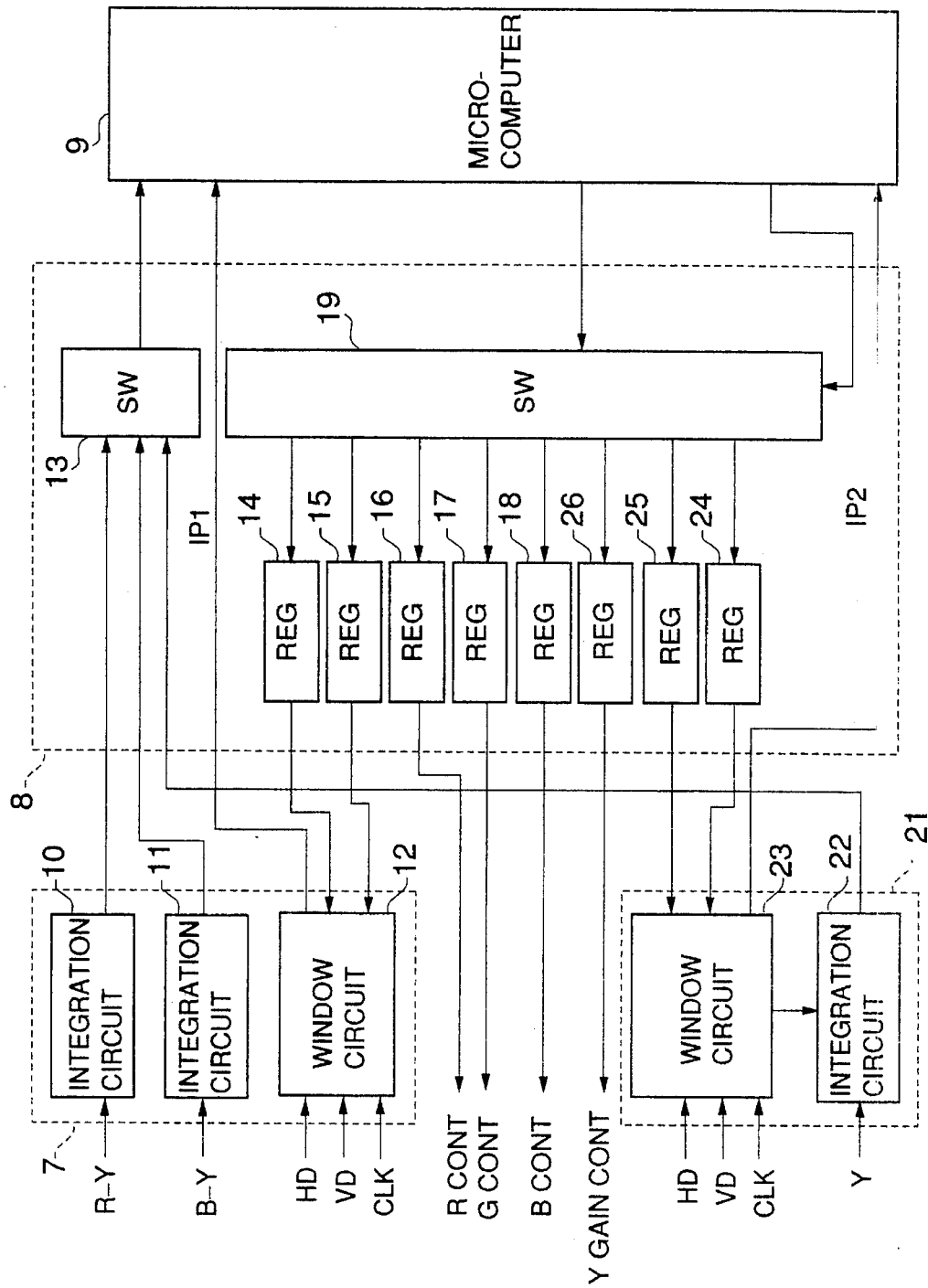
FIG. 5 is a block diagram showing in detail a construction of an AWB processing circuit, an interface circuit, a microcomputer, and an AGC processing circuit shown in FIG. 4.

FIG. 5 is a block diagram showing in detail a construction of the AWB processing circuit 7, interface circuit 8, microcomputer 9, and AGC processing circuit 21 shown in FIG. 4.

In the diagram, reference numeral 22 denotes an integration circuit to integrate the luminance signal; and 23 indicates a window circuit to instruct the fetching or omission of special data to the integration circuit 22 on the basis of a clock signal and a sync signal which are generated from the system clock generating circuit 20 and the position information and range information which are indicated from the microcomputer 9.

Reference numeral 24 denotes a position register to preserve the position information sent from the microcomputer 9; 25 a range register to preserve the range information sent from the microcomputer 9; 26 a control signal register to adjust the luminance signal level by the luminance signal processing circuit 4; 13 the switch to switch that the data of which one of the integration circuits 10, 11, and 22 is sent to the microcomputer 9; and 19 the switch to switch into which one of the position registers 14 and 24, the range registers 15 and 25, and the control signal registers 16, 17, 18, and 26 the data is written.

The operation of the video camera constructed as mentioned above will now be described. The same operations as those described in the first embodiment are designated by the same reference numerals.

The luminance signal which is generated from the luminance signal processing circuit 4 is also supplied to the AGC processing circuit 21. In the AGC processing circuit 21, the luminance signal is integrated by the integration circuit 22. In the AGC processing circuit 21, the window circuit 23 sets the integration circuit 22 into the "operative" state within the range of the window (in the range on the picture plane designated by the range information) and sets the integration circuit 22 into the "stop" state out of the window range on the basis of the clock signal and sync signal which are generated from the system clock generating circuit 20 and the position information and range information which are generated from the interface circuit 8, respectively.

After completion of the integrating operation of the signal of the last pixel in the window, the window circuit 23 generates an interruption signal $IP_2$ to the microcomputer 9. When the interruption signal is received, the microcomputer 9 switches the switch 13 in the interface circuit 8 and reads out the data from the integration circuit 22. After that, in order to set the next integration window, the microcomputer 9 writes new data into the position register 24 and range register 25. The apparatus waits until the integrating operation of the signal in the window based on the new data is finished in the integration circuit 22 and an interruption signal is again generated from the window circuit 23.

When the microcomputer 9 reads out the data from the integration circuit 22, the microcomputer calculates so that the luminance signal level is set to a proper value on the basis of the read-out data and writes the data to adjust the luminance signal gain in the luminance signal processing circuit 4 into the control signal register 26.

As mentioned above, the image information of the predetermined position and range on the picture plane is extracted. The luminance signal level is adjusted on the basis of the extracted image information. In the embodiment, when the integration of the extracted image information signal is finished, the window circuit 23 generates the interruption signal to the microcomputer 9. Therefore, the microcomputer 9 doesn't need to always monitor the end timing for the operation of the integration circuit. The microcomputer can concentratedly execute another control operation for a period of time after the interruption signal was generated until the next interruption signal is generated. Thus, the processing ability of the microcomputer 9 is improved.

The present invention is not limited to the foregoing embodiments but many modifications and variations are possible within the spirit and scope of the appended claims of the invention.

According to the video camera and its control method of the invention as described above, when the extracting operation of the partial image signal is finished, the extracting circuit generates the interruption signal to the microcomputer, so that the microcomputer doesn't need to always monitor the end timing for the operation of the extracting circuit. The microcomputer can concentratedly execute another control operation for a period of time after the interruption signal was generated until the next interruption signal is generated. Therefore, the processing ability of the microcomputer is improved and the operation of each section in the video camera can be executed at a high speed.

What is claimed is:

1. A video camera comprising:

an image pickup device for scanning an entire image and generating a whole image signal based on said entire image;

an extracting circuit for extracting a partial image signal corresponding to a predetermined picture plane range from said whole image signal which is generated from said image pickup device; and a computer for generating a correction value of said whole image signal according to an output signal of the extracting circuit, wherein said extracting circuit sends an interruption signal to said computer to interrupt other processing being carried out by said computer at a timing when said extracting circuit completes extracting of said partial image signal without waiting a vertical synchronization signal, to make said computer to start operating on said partial image signal.

2. A video camera according to claim 1, further having a correcting circuit to correct said whole image signal by control of said computer.

3. A video camera according to claim 2, wherein said correcting circuit corrects a white balance.

4. A video camera according to claim 2, wherein said correcting circuit corrects a gain of the image signal.

5. A video camera according to claim 1, wherein said computer sets said predetermined picture plane range in response to the interruption signal.

6. A control method of a video camera comprising the steps of:

scanning an entire image using an image pickup device and generating a whole image signal based on said entire image;

extracting a partial image signal corresponding to a predetermined picture plane range by an extracting circuit from said whole image signal; and deciding a correction value of said whole image signal by a computer on the basis of information of said extracted partial image signal;

wherein said extracting circuit sends an interruption signal to said computer to interrupt other processing being carried out by said computer at a timing when the extraction of said partial image signal has been completed without waiting a vertical synchronization signal, to make said computer to start operating on said partial image signal.

7. A method according to claim 3, wherein said correction value is a correction value of a white balance.

8. A method according to claim 3, wherein said correction value is a correction value of a gain.

9. A method according to claim 3, wherein said computer sets said predetermined picture plane range in response to the interruption signal.

10. A video camera comprising:
   (a) image pickup means for scanning an entire image and generating a whole image signal based on said entire image;
   (b) extracting means for extracting a partial image signal corresponding to a predetermined picture plane range from said whole image signal of said image pickup means;
   (c) processing means for processing the partial image signal to determine a correction value of said whole image signal; and
   (d) interruption signal generating means for sending an interruption signal to said processing means to interrupt other processing being carried out by said processing means at a timing when said extracting means completes extracting of the partial image signal without waiting a vertical synchronization signal, to make said processing means to start operating on the partial image signal.

11. A video camera according to claim 10, wherein said predetermined information is information as to color difference.

12. A video camera according to claim 10, wherein said processing means includes a microcomputer.

13. A video camera according to claim 10, wherein said predetermined information is information as to a signal level.

* * * * *

UNITED STATES PATENT AND TRADEMARK OFFICE
CERTIFICATE OF CORRECTION

PATENT NO. : 5,557,325
DATED : September 17, 1996
INVENTOR(S) : Osamu Ueda, et. al.

It is certified that error appears in the above-indentified patent and that said Letters Patent is hereby corrected as shown below:

Column 7, claim 7, line 1, delete "claim 3" and insert therefor --claim 6--.

claim 8, line, delete "claim 3" and insert therefor --claim 6--.

claim 8, line 1, delete "claim 3" and insert therefor -- claim 6--.

Signed and Sealed this

Twenty-sixth Day of November 1996

Attest:

BRUCE LEHMAN

*Attesting Officer*    *Commissioner of Patents and Trademarks*